US012305967B1

(12) United States Patent
Yi et al.

(10) Patent No.: US 12,305,967 B1
(45) Date of Patent: May 20, 2025

(54) METHOD FOR DESIGNING TERMINAL GUIDANCE LAW BASED ON DEEP REINFORCEMENT LEARNING (71) Applicant: Nanjing University of Science and Technology, Nanjing (CN)

(72) Inventors: Wenjun Yi, Nanjing (CN); Jian Huang, Nanjing (CN); Tianhong Xiong, Nanjing (CN); Guilin Jiang, Nanjing (CN); Lijun Ma, Nanjing (CN); Shu Yang, Nanjing (CN)

(73) Assignee: Nanjing University of Science and Technology, Nanjing (CN)

( * ) Notice: Subject to any disclaimer, the term of this patent is extended or adjusted under 35 U.S.C. 154(b) by 0 days.

(21) Appl. No.: 18/426,961

(22) Filed: Jan. 30, 2024

(51) Int. Cl.
*F42B 15/01* (2006.01)
*G06N 3/084* (2023.01)
*G06N 3/092* (2023.01)

(52) U.S. Cl.
CPC ............. *F42B 15/01* (2013.01); *G06N 3/084* (2013.01); *G06N 3/092* (2023.01)

(58) Field of Classification Search
None
See application file for complete search history.

(56) References Cited

U.S. PATENT DOCUMENTS 4,589,610 A  *  5/1986 Schmidt ..................... F41G 7/22
                                                           342/25 R
4,783,744 A  * 11/1988 Yueh ........................ F41G 7/30
                                                           702/85
5,365,460 A  * 11/1994 Chung ..................... F41G 7/2293
                                                           348/E5.09

(Continued)

FOREIGN PATENT DOCUMENTS

CN    111867139 A  * 10/2020  ............. G06N 3/084
CN    115639746 A  *  1/2023  ............. G05B 13/04

OTHER PUBLICATIONS

H. Holt et al, "Optimal Q-laws via reinforcement learning with guaranteed stability"; published in Acta Astronautica; 187 (2021), pp. 511-528; Elsevier; Amsterdam, The Netherlands. (Year: 2021).*
S. He et al, "Computational Missile Guidance: A Deep Reinforcement Learning Approach"; published in Journal of Aerospace Information Systems; Reston, VA, USA; vol. 18, No. 8; Aug. 2021. (Year: 2021).*

(Continued)

*Primary Examiner* — Bernarr E Gregory
(74) *Attorney, Agent, or Firm* — Jacob M. Ward; Ward Law Office LLC (57) ABSTRACT

The present disclosure discloses a method for designing a terminal guidance law based on deep reinforcement learning, and relates to the field of missile and rocket guidance. The method includes: establishing a relative kinematics equation between a missile and a target in a longitudinal plane of a target interception terminal guidance section of the missile; to adapt to a research paradigm of reinforcement learning, abstracting a research problem and modeling as a Markov decision process; building an algorithm network, and setting algorithm parameters, where a selected deep reinforcement learning algorithm is a deep Q-network (DQN); in a terminal guidance process of each round, obtaining a sufficient number of training samples through Q-learning, training a neural network and updating a target network at fixed frequencies respectively, and continuously repeating the above process before set learning rounds are reached.

7 Claims, 5 Drawing Sheets

(56) References Cited

U.S. PATENT DOCUMENTS

| | | | | |
|---|---|---|---|---|
| 6,138,945 | A * | 10/2000 | Biggers | F42B 15/00 |
| | | | | 244/164 |
| 6,629,085 | B1 * | 9/2003 | Krogmann | F41G 7/006 |
| | | | | 706/2 |
| 6,751,529 | B1 * | 6/2004 | Fouche | G05D 1/0858 |
| | | | | 244/164 |
| 2002/0083027 | A1 * | 6/2002 | Biggers | F41G 7/22 |
| | | | | 706/26 |
| 2022/0234765 | A1 * | 7/2022 | Haney | G06N 5/04 |

OTHER PUBLICATIONS

T. Deng et al, "Reinforcement learning-based missile terminal guidance of maneuvering targets with decoys"; published in Chinese Journal of Aeronautics; Elsevier, LTD,; Amsterdam, The Netherlands; 36(12): 309-324; published on-line on Jun. 2, 2023. (Year: 2023).*

* cited by examiner

METHOD FOR DESIGNING TERMINAL GUIDANCE LAW BASED ON DEEP REINFORCEMENT LEARNING

TECHNICAL FIELD

The present disclosure relates to the field of missile and rocket guidance, and in particular, to a method for designing a terminal guidance law based on deep reinforcement learning.

BACKGROUND

A terminal control law, which controls a missile flying at an ultra-high speed to hit an enemy target accurately, is defined as a terminal guidance law, and is also a crucial technology of a prevention and control system. A controlled quantity output by a guidance law is a key basis for intercepting a missile to adjust a missile body flying attitude of the missile. At present, most of guidance laws actually applied in engineering practice are based on proportional navigation guidance (PNG) laws or improved guidance laws thereof. The principle is to keep an invariable direct ratio of a line-of-sight rate of the missile and the target to a rotation rate of a velocity vector of the missile by a using missile-borne steering engine or other control means.

Under ideal circumstances, the PNG law can achieve a good hit effect, but considering inherent non-ideality of an aerodynamic model of a missile body, inherent delay of an autopilot and a goal of implementing high maneuver, the guidance law may cause a high miss distance.

SUMMARY

To solve the above technical defects in the prior art, the present disclosure provides a method for designing a terminal guidance law based on deep reinforcement learning.

The technical solution for achieving the objective of the present disclosure is as follows: A method for designing a terminal guidance law based on deep reinforcement learning includes the following steps:

step 1: establishing a relative kinematics equation between a missile and a target in a longitudinal plane of a target interception terminal guidance section of the missile;

step 2: abstracting a solving problem of the kinematics equation and modeling as a Markov decision process;

step 3: building an algorithm network, setting algorithm parameters, and training the algorithm network based on a randomly initialized data set to determine weight parameters of an initial network;

step 4: continuously caching, by an agent, state transition data and reward values as learning samples in an experience pool based on a Q-Learning algorithm, and continuously selecting a fixed number of samples from the experience pool to train the network until set learning rounds are reached; and step 5: generating, during a specific guidance process, an action in real time based on a current state by using a learned network to transfer to a next state, and continuously repeating the process until the target is hit to complete the guidance process.

Preferably, step 1 of establishing a relative kinematics equation between a missile and a target in a longitudinal plane of a target interception terminal guidance section of the missile is specifically as follows:

$$x_r = x_t - x_m$$

$$y_r = y_t - y_m$$

$$\dot{x}_r = V_t \cos\theta_t - V_m \cos\theta_m$$

$$\dot{y}_r = V_t \sin\theta_t - V_m \sin\theta_m$$

$$r = \sqrt{x_r^2 + y_r^2}$$

$$q = \tan^{-1}\left(\frac{y_t - y_m}{x_t - x_m}\right)$$

$$\dot{r} = \frac{x_r \dot{x}_r + y_r \dot{y}_r}{\sqrt{x_r^2 + y_r^2}}$$

$$\dot{q} = \frac{x_r \dot{y}_r + y_r \dot{x}_r}{x_r^2 + y_r^2}$$

where xx is horizontal coordinates of the target, $x_m$ is horizontal coordinates of the missile, $x_r$ is a lateral relative distance between the target and the missile, $y_t$ is vertical coordinates of the target, $y_m$ is vertical coordinates of the missile, $y_r$ is a longitudinal relative distance between the target and the missile, $V_t$ is a linear velocity of the target, $\theta_t$ is an included angle between a linear velocity direction of the target and a horizontal direction, $V_m$ is a linear velocity of the missile, $\theta_m$ is an included angle between a linear velocity direction of the missile and the horizontal direction, $\dot{x}_r$ is a change rate of a lateral distance between the target and the missile, $\dot{y}_r$ is a change rate of a longitudinal distance between the target and the missile, r is a relative distance between the missile and the target, q is an angle between a line of sight between the missile and the target and the horizontal direction, and is also referred to as a line-of-sight angle, $\dot{r}$ is a relative distance change rate, and $\dot{q}$ is a line-of-sight angle change rate.

Preferably, the abstracting a solving problem of the kinematics equation and modeling as a Markov decision process specifically includes:

setting an action space specifically as follows: constructing the action space with a proportional navigation guidance (PNG) law used as expert experience;

setting a state space specifically as follows: using a line-of-sight rate as a state space of a current known problem; and setting a reward function specifically as follows:

$$R = \begin{cases} 10000000, r_{end} \leq r_{hit} \\ 0, r_{end} > r_{hit} \\ \dfrac{1}{r_t}, t = 0, \ldots, \text{end} - 1 \end{cases}$$

where $r_{hit}$ is a relative distance for the missile to finally hit the target, $r_{end}$ is a relative distance between the missile and the target at a termination time, end is duration of a whole cycle at the termination time, and $r_t$ is a distance between the missile and the target at a time t during simulation.

Preferably, a specific process of constructing an action space with a PNG law used as expert experience includes:

expressing as $n = K|\dot{r}|\dot{q}$ with a relative velocity and the line-of-sight rate as inputs and an overload instruction as an output, where K is a proportionality coefficient, $\dot{r}$ is the relative velocity, and $\dot{q}$ is the line-of-sight rate; discretizing the proportionality coefficient K into a finite value within a certain value range as the action space, determining the proportionality coefficient by selecting an action in the action space, and thus calculating the overload instruction.

Preferably, initializing weight parameters of a neural network includes the following specific steps:

step 301: determining a back propagation (BP) neural network as the algorithm network, with an input being a (state, action) two-dimensional column vector, and an output being a Q value corresponding to a (state, action) binary group;

invoking a random function within a given value range to generate a series of random data as an input data set of the network, and calculating based on the reward function to use the random data set as state and action reward values and as an output reference data set; and step 302: training the neural network based on the data set obtained in step 301 to determine initial weight parameters of the neural network.

Preferably, a specific method of training the neural network and updating a target network at a fixed frequency includes:

in each simulation step, for a current state, selecting an action to be performed from the action space by using a ε-greedy policy, integrating based on a kinetic equation to obtain a state at a next time, and calculating the obtained reward values; and setting the experience pool, and saving the current state, the action to be performed, the reward values and the next state as experience in the experience pool; and randomly selecting a data set with a certain size from the experience pool at a fixed frequency, calculating a corresponding target value of the data set, training the neural network by using the data set and the target value corresponding to the data set, and updating the target network at a certain frequency, that is, replacing the target network with a network that has been trained for some time before.

Preferably, a specific method for calculating the target value is as follows:

$$Q_{Target} = Q(s_t, a_t) + \alpha[R_t + \gamma \max_a Q(s_{t+1}, a) - Q(s_t, a_t)]$$

where $Q_{target}$ represents a value Q corresponding to updated $(s_t, a_t)$, $s_t$ represents a state at a tim t, $a_t$ represents an action performed in the state $s_t$, $Q(s_t, a_t)$ represents a value Q for performing the action at in the state $s_t$, a represents a learning rate and a rate at which the value Q is updated, $R_t$ represents a reward value obtained by performing the action at in the state $s_t$, y represents a discount rate, $s_{t+1}$ represents a state at a time t+1, and $\max_a Q(s_{t+1}, a)$ represents a value Q for performing an optimal action in the state $s_{t+1}$.

Compared with the prior art, the present disclosure has the remarkable advantages that according to the present disclosure, an algorithm applying deep reinforcement learning is provided to obtain an optimal navigation ratio sequence through off-line learning within a given navigation ratio range, so that the missile can select the most appropriate navigation ratio parameter to generate a required overload based on the current state at all times, thereby solving the difficulty in selecting the navigation ratio to a certain extent and improving hit accuracy.

Other features and advantages of the present disclosure will be described in the following description, and some of these will become apparent from the description or be understood by implementing the present disclosure. The objectives and other advantages of the present disclosure may be realized and attained by the structure particularly pointed out in the written description, claims, and the accompanying drawings.

BRIEF DESCRIPTION OF THE DRAWINGS

The accompanying drawings are provided merely for illustrating the specific embodiments, rather than to limit the present disclosure. The same reference numerals represent the same components throughout the accompanying drawings.

DETAILED DESCRIPTION

It is readily understood that, according to the technical solutions of the present disclosure, those of ordinary skill in the art can imagine various implementations of the present disclosure without changing the essential spirit of the present disclosure. Therefore, the following specific implementations and accompanying drawings are merely an exemplary illustration of the technical solutions of the present disclosure and should not be regarded as all of the present disclosure or the restriction or limitation on the technical solutions of the present disclosure. Rather, these embodiments are provided to enable those skilled in the art to understand the present disclosure more thoroughly. Preferred embodiments of the present disclosure will be described in detail below with reference to the accompanying drawings. The accompanying drawings constitute a part of the present application and are used together with the embodiments of the present disclosure to explain the innovative concept of the present disclosure.

The concept of the present disclosure is as follows: A method for designing a terminal guidance law based on deep reinforcement learning includes the following steps.

Figure 1:
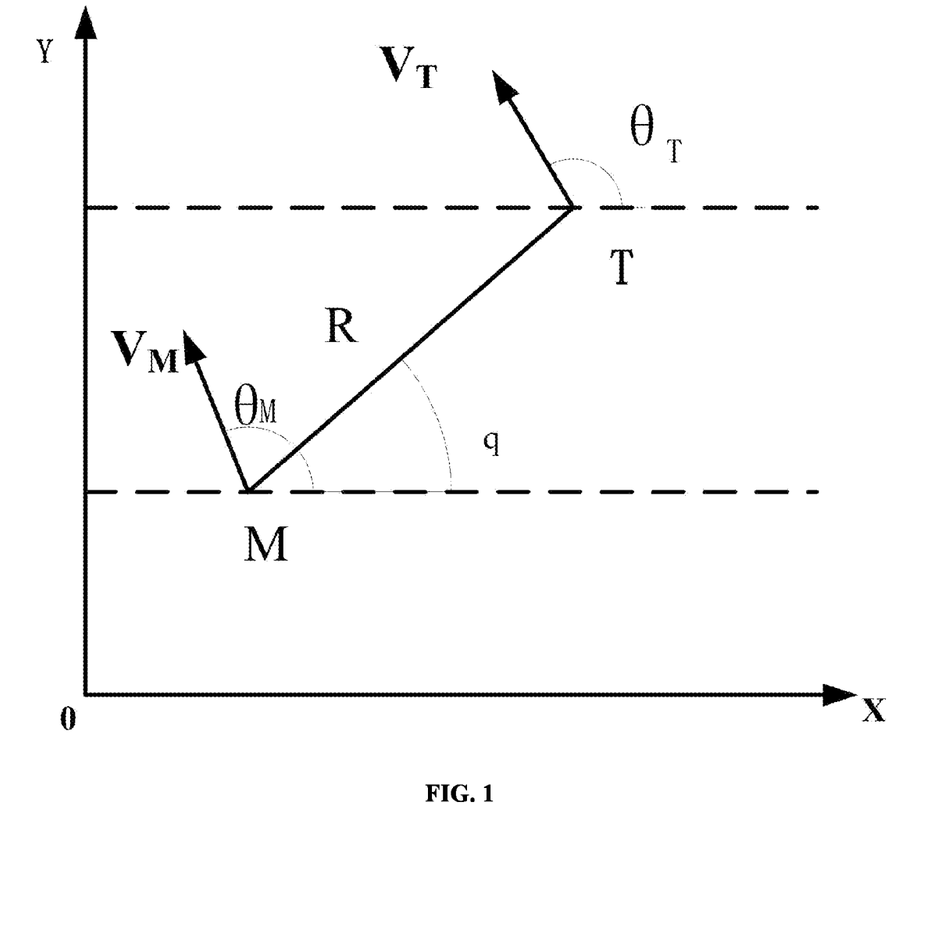
FIG. 1 is a geometric schematic diagram showing engagement in a missile interception terminal guidance plane according to a specific example of the present disclosure.
Figure 2:
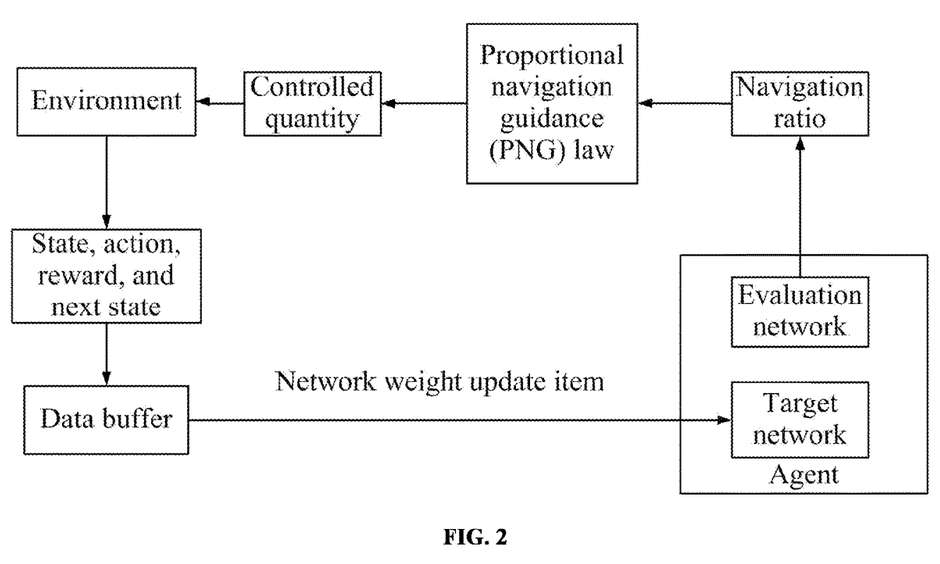
FIG. 2 is a schematic diagram of terminal guidance law learning based on deep reinforcement learning according to the present disclosure.
Figure 3:
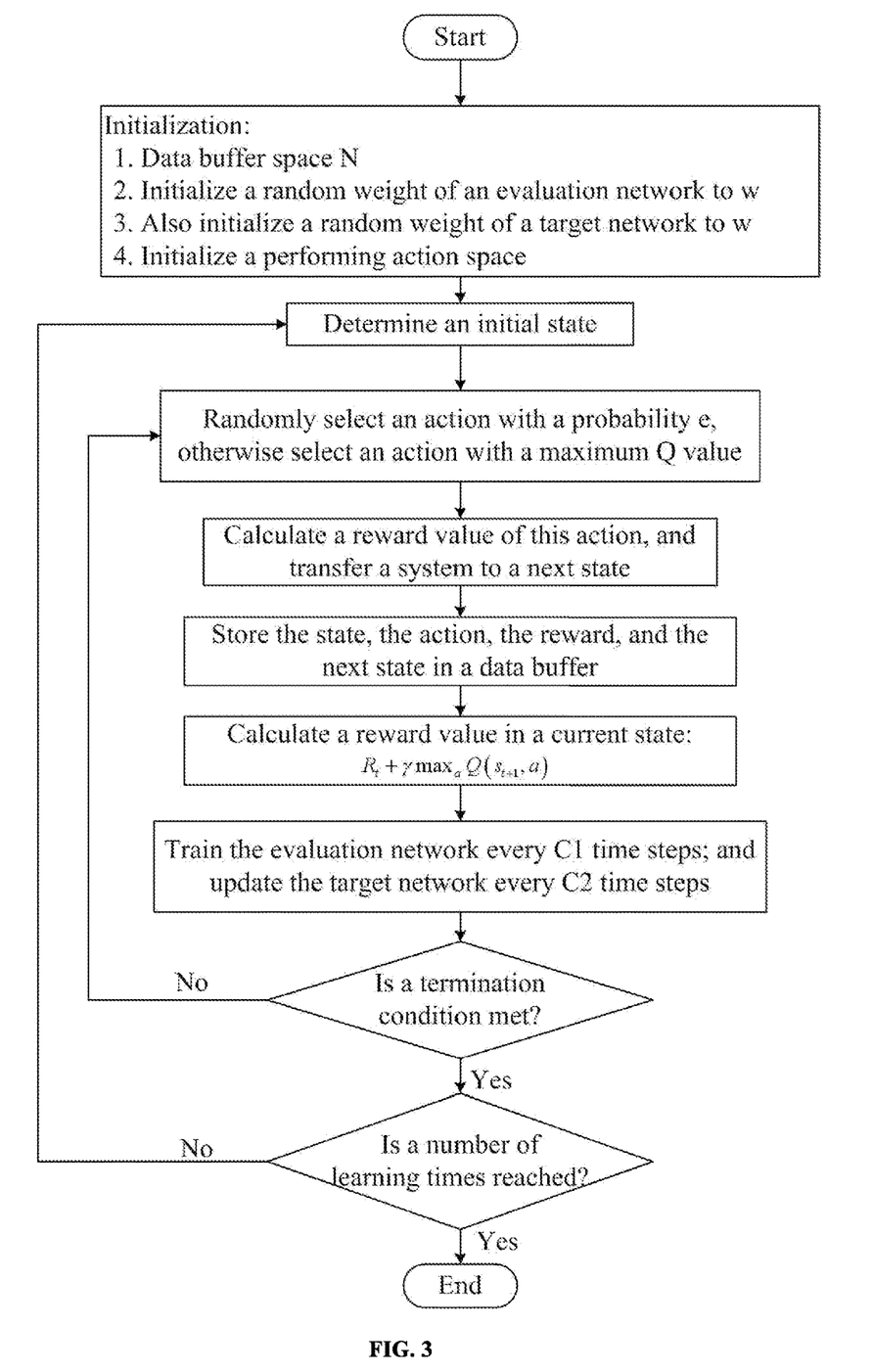
FIG. 3 is a flowchart of a deep reinforcement learning algorithm according to the present disclosure.

Step 1: With reference to FIG. 1 which is a geometric schematic diagram showing engagement in a missile interception terminal guidance plane, establish a relative kinematics equation between a missile and a target in a longitudinal plane of a target interception terminal guidance section of the missile as follows:

$$x_r = x_t - x_m$$

$$y_r = y_t - y_m$$

$$\dot{x}_r = V_t \cos\theta_t - V_m \cos\theta_m$$

$$\dot{y}_r = V_t \sin\theta_t - V_m \sin\theta_m$$

$$r = \sqrt{x_r^2 + y_r^2}$$

$$q = \tan\left(\frac{y_t - y_m}{x_t - x_m}\right)$$

-continued $$\dot{r} = \frac{x_r \dot{x}_r + y_r \dot{y}_r}{\sqrt{x_r^2 + y_r^2}}$$

$$\dot{q} = \frac{x_r \dot{y}_r + y_r \dot{x}_r}{x_r^2 + y_r^2}$$

where $x_t$ is horizontal coordinates of the target, $x_m$ is horizontal coordinates of the missile, $x_r$ is a lateral relative distance between the target and the missile, $y_r$ is vertical coordinates of the target, $y_m$ is vertical coordinates of the missile, $y_r$ is a longitudinal relative distance between the target and the missile, $V_t$ is a linear velocity of the target, $\theta_t$ is an included angle between a linear velocity direction of the target and a horizontal direction, $V_m$ is a linear velocity of the missile, $\theta_m$ is an included angle between a linear velocity direction of the missile and the horizontal direction, $\dot{x}_r$ is a change rate of a lateral distance between the target and the missile, $\dot{y}_r$ is a change rate of a longitudinal distance between the target and the missile, r is a relative distance between the target and the missile, q is an angle between a line of sight between the missile and the target and the horizontal direction, and is also referred to as a line-of-sight angle, ṙ is a relative distance change rate, and q̇ is a line-of-sight angle change rate.

Step 2: Abstract a solving problem of the kinematics equation and model as a Markov decision process.

Further, step 2 specifically includes:

setting an action space; and to prevent excessive action space search, which results in that a final algorithm cannot converge, constructing the action space with a PNG law used as expert experience;

specifically, expressing the PNG law as n=K|ṙ|q̇ with a relative velocity and the line-of-sight rate as inputs and an overload instruction as an output, where K is a proportionality coefficient, ṙ is the relative velocity, and q̇ is the line-of-sight rate; discretizing the proportionality coefficient K into a finite value within a certain value range as the action space, determining the proportionality coefficient by selecting an action in the action space, and thus calculating the overload instruction;

setting a state space, where in the guidance law design, the selected state space must contain all states of the guidance process, and the line-of-sight rate q̇ is used as a state space of a current known problem, which can fully represent all the states of motion; and setting a reward function, where a deep Q-network (DQN) algorithm uses the reward function to determine how well an action is performed; in the process of pursuit by the missile, if the relative distance between the missile and the target is shortened at adjacent times, a positive reward is obtained; if the missile finally hits the target, a greater reward is obtained, but on the contrary, if the missile does not t hit the target, the reward is set to 0; and to sum up, the reward function is set as follows:

$$R = \begin{cases} 10000000, & r_{end} \leq r_{hit} \\ 0, & r_{end} > r_{hit} \\ \frac{1}{r_t}, & t = 0, \ldots, \text{end} - 1 \end{cases}$$

where $r_{hit}$ is a relative distance for the missile to finally hit the target, $r_{end}$ is a relative distance between the missile and the target at a termination time, end is duration of a whole cycle at the termination time, and $r_t$ is a distance between the missile and the target at a time t during simulation. During target pursuit by the missile, the relative velocity r is always negative, and when r changes from negative to positive at a time, the time is the termination time.

Step 3: Build an algorithm network, set algorithm parameters, and train the algorithm network based on a randomly initialized data set to determine weight parameters of an initial network; and specifically, determine that a BP neural network is used as the algorithm network, with an input being a (state, action) two-dimensional column vector, and an output being a Q value corresponding to a (state, action) binary group, where the significance of this value is to determine a performed optimal action based on the Q values of different actions performed in the same state; invoke a random function within a given value range to generate a series of random data as an input data set of the network, and calculate based on the reward function in step 4 to use the random data set as state and action reward values and as an output reference data set.

Step 4: Continuously cache, by an agent, state transition data and reward values as learning samples in an experience pool based on a Q-Learning algorithm, and continuously select a fixed number of samples from the experience pool to train the network until set learning rounds are reached, including the following specific steps:

in each simulation step, for a current state, determining a behavior to take by using a ε-greedy policy, integrating based on a kinetic equation to obtain a state at a next time, and calculating the obtained reward values; and setting the experience pool, and saving the current state, the action to be performed, the reward values and the next state that are obtained above, that is, $(s_t, a_t, r_t, s_{t+1})$, as experience in the experience pool; and randomly selecting a data set with a certain size from the experience pool at a fixed frequency, and then calculating a corresponding target value of the data set, with a specific calculation method as follows: $Q_{target} = Q(s_t, a_t) + \alpha[R_t + \gamma \max_a Q(s_{t+1}, a) - Q(s_t, a_t)]$, where $Q_{target}$ represents a value Q corresponding to updated $(s_t, a_t)$, $s_t$ represents a state at a time t, at represents an action performed in the state $s_t$, $Q(s_t, a_t)$ represents a value Q for performing the action at in the state $s_t$, a represents a learning rate and a rate at which the value Q is updated, $R_t$ represents a reward value obtained by performing the action at in the state $s_t$, γ represents a discount rate, and is an importance degree of future experience to an action performed in the current state, $s_{t+1}$ represents a state at a time t+1, and $\max_a Q(s_{t+1}, a)$ represents a value Q for performing an optimal action in the state $s_{t+1}$; and then training the neural network by using the data set and the corresponding obtained target value, until set learning rounds are reached.

Step 5: Generate, during a specific guidance process, an action in real time based on a current state by using a learned network to transfer to a next state, and continuously repeat the process until the target is hit to complete the guidance process.

In a specific example of the present disclosure, initial conditions were set as follows:

| Parameter | Initial value |
|---|---|
| Initial position (m) of a missile | (0, 0) |
| Initial position (m) of a target | (5000, 5000) |
| Initial velocity (m/s) of the missile | 600 |
| Initial velocity (m/s) of the target | 300 |
| Initial trajectory inclination angle (°) of the missile | 60 |
| Initial trajectory inclination angle (°) of the target | 0 |
| Fixed maneuver value (g) of the target | 7 |

The action space, that is, the navigation ratio, was designed as A={2, 2.12.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0}. A neural network was set as two hidden layers with 40 neurons in each layer, and a gradient descent method was selected as an error back propagation policy. There were a total of 2,200 learning rounds. With the increase of learning rounds, a miss distance was finally converged to a lower value from initial random distribution, thus proving the convergence of the algorithm of the present disclosure.

Figure 4:
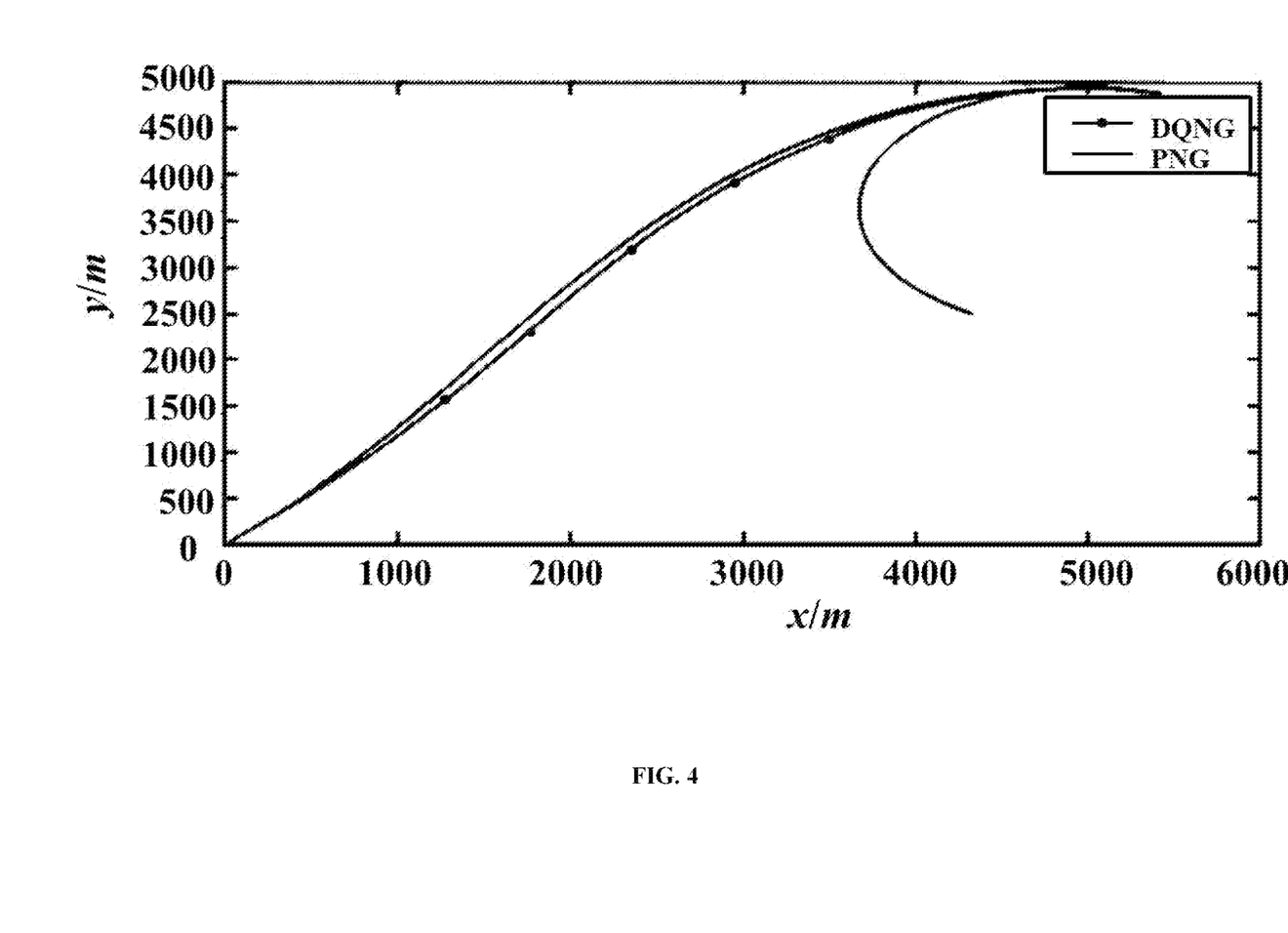
FIG. 4 is a two-dimensional motion track diagram of a missile and a target according to a specific example of the present disclosure.
Figure 5:
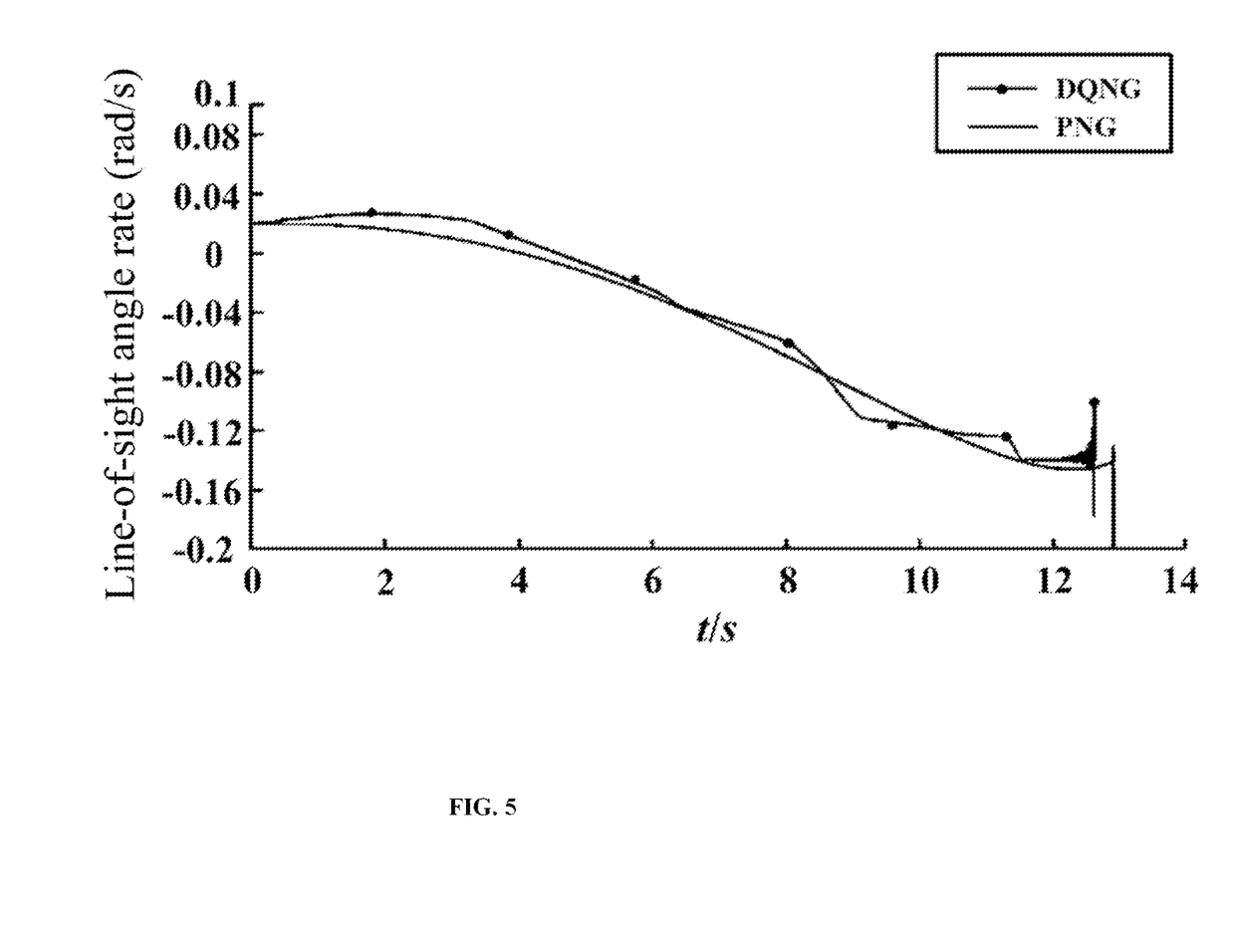
FIG. 5 shows a line-of-sight angular velocity curve graph according to a specific example of the present disclosure.

The learned algorithm model was applied to intercept the target, a guidance trajectory was calculated by using a fourth-order Runge-Kutta solution, and a trajectory diagram shown in FIG. 4 was obtained. A deep Q-network guidance (DQNG) law based on deep reinforcement learning was compared with a conventional PNG law, where the DQNG had a miss distance of 0.5386 m, and the QNG had a miss distance of 1.3268 m. It was found that the DONG had a relatively bent guidance trajectory and the missile could approach the target faster to implement accurate strike. The hit time of the DONG was 12.44 s, while the hit time of the PNG was 12.94 s. In comparison, the DQNG could intercept the target faster.

The above are merely preferred specific implementations of the present disclosure, but the protection scope of the present disclosure is not limited thereto. Any modification or replacement easily conceived by those skilled in the art within the technical scope of the present disclosure should fall within the protection scope of the present disclosure.

It should be understood that to simplify the present disclosure and help those skilled in the art to understand various aspects of the present disclosure, in the above description of exemplary embodiments of the present disclosure, various features of the present disclosure are sometimes described in a single embodiment or described with reference to a single figure. However, the present disclosure should not be interpreted as that all the features included in the exemplary embodiment are necessary technical features of claims of this patent.

It should be understood that the modules, units, assemblies, and the like included in a device in an embodiment of the present disclosure can be adaptively changed to be arranged in a device different from the device in this embodiment. Different modules, units or assemblies included in the device in the embodiment can be combined into one module, unit or assembly, and can also be divided into a plurality of sub-modules, sub-units or sub-assemblies.

What is claimed is:

1. A method for designing a terminal guidance law based on deep reinforcement learning, comprising the following steps:
   establishing a relative kinematics equation between a missile and a target in a longitudinal plane of a target interception terminal guidance section of the missile;
   abstracting a solving problem of the kinematics equation and modeling as a Markov decision process;
   building an algorithm network, setting algorithm parameters, and training the algorithm network based on a randomly initialized data set to determine weight parameters of an initial network;
   continuously caching, by an agent, state transition data and reward values as learning samples in an experience pool based on a Q-Learning algorithm, and continuously selecting a fixed number of samples from the experience pool to train the network until set learning rounds are reached; and
   generating, during a specific guidance process, an action in real time based on a current state by using a learned network to transfer to a next state, and continuously repeating the process until the target is hit to complete the guidance process.

2. The method for designing a terminal guidance law based on deep reinforcement learning according to claim 1, wherein step 1 of establishing a relative kinematics equation between a missile and a target in a longitudinal plane of a target interception terminal guidance section of the missile is specifically as follows:

$$x_r = x_t - x_m$$

$$y_r = y_t - y_m$$

$$\dot{x}_r = V_t \cos\theta_t - V_m \cos\theta_m$$

$$\dot{y}_r = V_t \sin\theta_t - V_m \sin\theta_m$$

$$r = \sqrt{x_r^2 + y_r^2}$$

$$q = \arctan\left(\frac{y_t - y_m}{x_t - x_m}\right)$$

$$\dot{r} = \frac{x_r \dot{x}_r + y_r \dot{y}_r}{\sqrt{x_r^2 + y_r^2}}$$

$$\dot{q} = \frac{x_r \dot{y}_r + y_r \dot{x}_r}{x_r^2 + y_r^2}$$

wherein $x_t$ is horizontal coordinates of the target, $x_m$ is horizontal coordinates of the missile, $x_r$ is a lateral relative distance between the target and the missile, $y_t$ is vertical coordinates of the target, $y_m$ is vertical coordinates of the missile, $y_r$ is a longitudinal relative distance between the target and the missile, $V_t$ is a linear velocity of the target, $\theta_t$ is an included angle between a linear velocity direction of the target and a horizontal direction, $V_m$ is a linear velocity of the missile, $\theta_m$ is an included angle between a linear velocity direction of the missile and the horizontal direction, $\dot{x}_r$ is a change rate of a lateral distance between the target and the missile, $\dot{y}_r$ is a change rate of a longitudinal distance between the target and the missile, r is a relative distance between the target and the missile, q is an angle between a line of sight between the missile and the target and the horizontal direction, and is also referred to as a line-of-sight angle, ṙ is a relative distance change rate, and q̇ is a line-of-sight angle change rate.

3. The method for designing a terminal guidance law based on deep reinforcement learning according to claim 1, wherein the abstracting a solving problem of the kinematics equation and modeling as a Markov decision process specifically comprises:
  setting an action space specifically as follows: constructing the action space with a proportional navigation guidance (PNG) law used as expert experience;
  setting a state space specifically as follows: using a line-of-sight rate q̇ as a state space of a current known problem; and
  setting a reward function specifically as follows:

$$R = \begin{cases} 10000000, r_{end} \leq r_{hit} \\ 0, r_{end} > r_{hit} \\ \dfrac{1}{r_t}, t = 0, \ldots, \text{end} - 1 \end{cases}$$

wherein $r_{hit}$ is a relative distance for the missile to finally hit the target, $r_{end}$ is a relative distance between the missile and the target at a termination time, end is duration of a whole cycle at the termination time, and $r_t$ is a distance between the missile and the target at a time t during simulation.

4. The method for designing a terminal guidance law based on deep reinforcement learning according to claim 3, wherein a specific process of constructing an action space with a PNG law used as expert experience comprises:
  expressing as n=K|ṙ|q̇ with a relative velocity and the line-of-sight rate as inputs and an overload instruction as an output, wherein K is a proportionality coefficient, ṙ is the relative velocity, and q̇ is the line-of-sight rate; discretizing the proportionality coefficient K into a finite value within a certain value range as the action space, determining the proportionality coefficient by selecting an action in the action space, and thus calculating the overload instruction.

5. The method for designing a terminal guidance law based on deep reinforcement learning according to claim 1, wherein initializing weight parameters of a neural network comprises the following specific steps:
  determining a back propagation (BP) neural network as the algorithm network, with an input being a (state, action) two-dimensional column vector, and an output being a Q value corresponding to a (state, action) binary group;
  invoking a random function within a given value range to generate a series of random data as an input data set of the network, and calculating based on the reward function to use the random data set as state and action reward values and as an output reference data set; and
  training the neural network based on the data set obtained in step 301 to determine initial weight parameters of the neural network.

6. The method for designing a terminal guidance law based on deep reinforcement learning according to claim 1, wherein a specific method of training the neural network and updating a target network at a fixed frequency comprises:
  in each simulation step, for a current state, selecting an action to be performed from the action space by using a e-greedy policy, integrating based on a kinetic equation to obtain a state at a next time, and calculating the obtained reward values; and setting the experience pool, and saving the current state, the action to be performed, the reward values and the next state as experience in the experience pool; and
  randomly selecting a data set with a certain size from the experience pool at a fixed frequency, calculating a corresponding target value of the data set, training the neural network by using the data set and the target value corresponding to the data set, and updating the target network at a certain frequency, that is, replacing the target network with a network that has been trained for some time before.

7. The method for designing a terminal guidance law based on deep reinforcement learning according to claim 6, wherein a specific method for calculating the target value is as follows:

$$Q_{Target} = Q(s_t, a_t) + \alpha[R_t + \gamma \max_a Q(s_{t+1}, a) - Q(s_t, a_t)]$$

wherein $Q_{target}$ represents a value Q corresponding to updated $(s_t, a_t)$, $s_t$ represents a state at a time t, $a_t$ represents an action performed in the state $s_t$, $Q(s_t, a_t)$ represents a value Q for performing the action $a_t$ in the state $s_t$, $\alpha$ represents a learning rate and a rate at which the value Q is updated, $R_t$ represents a reward value obtained by performing the action $a_t$ in the state $s_t$, $\gamma$ represents a discount rate, $s_{t+1}$ represents a state at a time t+1, and $\max_a Q(s_{t+1}, a)$ represents a value Q for performing an optimal action in the state $s_{t+1}$.

* * * * *